US008493438B2

(12) United States Patent
Bassali et al.

(10) Patent No.: US 8,493,438 B2
(45) Date of Patent: Jul. 23, 2013

(54) METHODS AND SYSTEMS FOR PRESENTING THREE-DIMENSIONAL VIDEO CONTENT

(75) Inventors: Harpal S. Bassali, San Francisco, CA (US); Armando P. Stettner, Westford, MA (US); Michael P. Ruffini, Methuen, MA (US); Marcelo D. Lechner, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 629 days.

(21) Appl. No.: 12/715,024

(22) Filed: Mar. 1, 2010

(65) Prior Publication Data
US 2011/0211049 A1    Sep. 1, 2011

(51) Int. Cl.
*H04N 13/04*    (2006.01)
(52) U.S. Cl.
USPC ............................... 348/51; 348/56; 359/464
(58) Field of Classification Search
USPC ....................................................... 348/42–60
See application file for complete search history.

(56) References Cited

U.S. PATENT DOCUMENTS

| 4,562,463 | A | * | 12/1985 | Lipton | 348/56 |
| 5,028,994 | A | * | 7/1991 | Miyakawa et al. | 348/49 |
| 5,835,132 | A | * | 11/1998 | Okino et al. | 348/42 |
| 5,973,831 | A | * | 10/1999 | Kleinberger et al. | 359/465 |
| 6,078,352 | A | * | 6/2000 | Nakaya et al. | 348/42 |
| 6,088,052 | A | * | 7/2000 | Guralnick | 348/51 |
| 2006/0203085 | A1 | * | 9/2006 | Tomita | 348/51 |
| 2008/0232769 | A1 | * | 9/2008 | Jureczki et al. | 386/94 |

* cited by examiner

*Primary Examiner* — Sath V Perungavoor
*Assistant Examiner* — Dakshesh Parikh

(57) ABSTRACT

An exemplary method includes receiving, by a three-dimensional ("3D") adapter subsystem separate from and communicatively coupled to a display device, a 3D video content stream comprising data representative of 3D video content, directing, by the 3D adapter subsystem, the display device to generate and display the 3D video content in accordance with the 3D video content stream, and calibrating, by the 3D adapter subsystem, the display of the 3D video content in accordance with one or more attributes of the display device. Corresponding methods and systems are also described.

16 Claims, 11 Drawing Sheets

METHODS AND SYSTEMS FOR PRESENTING THREE-DIMENSIONAL VIDEO CONTENT

BACKGROUND INFORMATION

Stereoscopic or three-dimensional ("3D") movies, video games, and other video content have become increasingly popular as digital imaging technologies have evolved. Typical 3D imaging techniques involve displaying separate images intended for the left and right eyes. By viewing the images through glasses configured to allow the left image to be perceived by only the left eye and the right image to be perceived by only the right eye, a viewer is able to see a single composite 3D image.

Specially designed 3D televisions capable of displaying 3D video content and intended for the home market have been recently introduced. However, consumers have been slow to purchase 3D televisions because of their relatively high price points compared to traditional two-dimensional ("2D") televisions and because of a lack of available 3D television programming. Content providers, on the other hand, have been hesitant to invest in the production of 3D television programming because of the lack of widespread consumer adoption of 3D televisions.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary methods and systems for presenting three-dimensional ("3D") video content on a display device not inherently configured to generate and display 3D video content are described herein. As described in more detail below, a 3D adapter subsystem separate from and communicatively coupled to a display device may receive a 3D video content stream comprising data representative of 3D video content. The 3D adapter subsystem may process the 3D video content stream in accordance with a suitable 3D content processing heuristic (e.g., an active shutter processing heuristic and/or a passive polarized processing heuristic) and direct the display device to generate and display the 3D video content in accordance with the 3D video content stream. The 3D adapter subsystem may be further configured to calibrate the display of the 3D video content in accordance with one or more attributes of the display device. As will be described in more detail below, the calibration may result in an optimized 3D video content viewing experience for the viewer.

As used herein, the term "3D video content" may refer generally to any video content intended to be presented in 3D. Such video content may include, but is not limited to, any television program, on-demand media program, pay-per-view media program, broadcast media program (e.g., broadcast television program), multicast media program, narrowcast media program, IPTV content, advertisement (e.g., commercial), video, movie, or any segment, component, or combination of these or other forms of media content that may be viewed by a user.

The methods and systems described herein facilitate presentation of 3D video content by display devices (e.g., televisions) heretofore configured to be able to display only 2D video content. Such display devices are referred to herein as "2D display devices." Hence, the methods and systems described herein may enable viewers who only have 2D display devices to be able to experience 3D video content.

Figure 1:
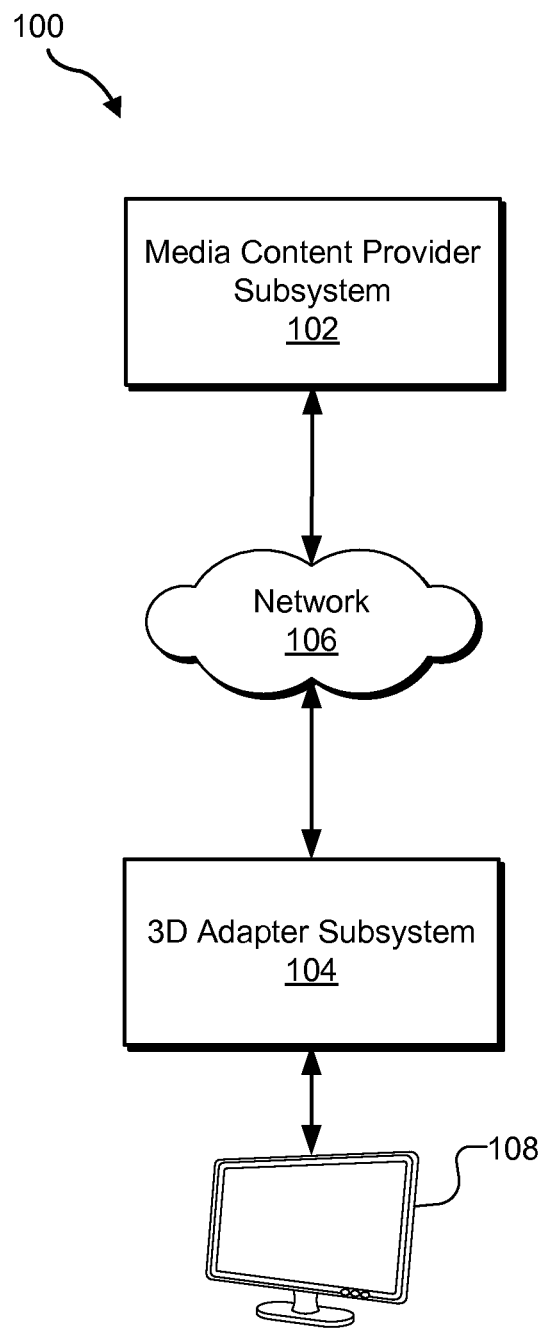
FIG. 1 illustrates an exemplary three-dimensional ("3D") video content delivery system according to principles described herein.

FIG. 1 illustrates an exemplary 3D video content delivery system 100 (or simply "system 100"). System 100 may include a media content provider subsystem 102 (or simply "provider subsystem 102") and a 3D adapter subsystem 104 (or simply "adapter subsystem 104") in communication with one another via a network 106. As shown in FIG. 1, adapter subsystem 104 may be separate from and communicatively coupled to a 2D display device 108. As used herein, a "2D display device 108" (or simply "display device 108") may include any display device (e.g., television) not inherently configured to generate and display 3D video content. Hence, a 2D display device may generate and display only traditional 2D video content when not communicatively coupled to adapter subsystem 104. Exemplary 2D display devices 108 include, but are not limited to, televisions, computer monitors, handheld computing devices with display screens, mobile devices (e.g., mobile phones), and/or any other device configured to generate and display 2D video content. As will be described in more detail below, adapter subsystem 104 may be configured to facilitate generation and display of 3D video content by 2D display device 108.

Provider subsystem 102 and adapter subsystem 104 may communicate using any suitable communication technologies, devices, networks, media, and protocols supportive of remote data communications. For example, provider subsystem 102 and adapter subsystem 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between provider subsystem 102 and adapter subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between provider subsystem 102 and adapter subsystem 104. Communications between provider subsystem 102 and adapter subsystem 104 may be transported using any one of above-listed networks, or any combination or sub-combination of the above-listed networks.

Figure 2:
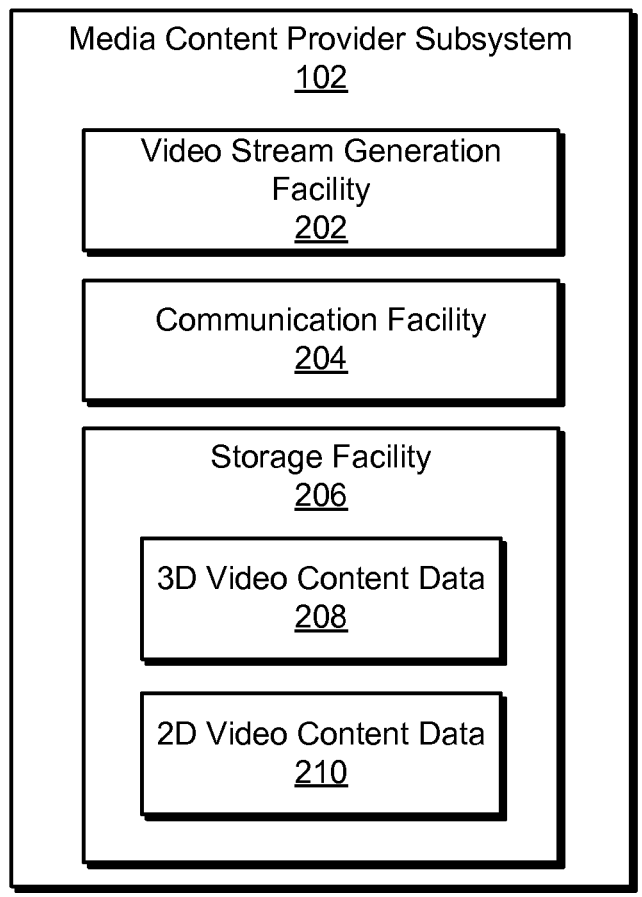
FIG. 2 illustrates exemplary components of a provider subsystem according to principles described herein.

FIG. 2 illustrates exemplary components of provider subsystem 102. As shown in FIG. 2, provider subsystem 102 may include a 3D video content stream generation facility 202, a communication facility 204, and a storage facility 206, which may be in communication with one another using any suitable communication technologies. It will be recognized that although facilities 202-206 are shown to be separate facilities in FIG. 2, any of those facilities may be combined into a single facility as may serve a particular application.

Video content stream generation facility 202 may be configured to generate a 3D video content stream comprising data representative of 3D video content. The 3D video content stream may be generated in accordance with any suitable heuristic, standard, and/or format. For example, an exemplary 3D video content stream that may be generated by video content stream generation facility 202 includes a plurality of video frames each comprising data representative of a left image intended for a left eye of a viewer and data representative of a right image intended for a right eye of the viewer. As will be described in more detail, adapter subsystem 104 may be configured to convert each of these video frames to a format suitable for display device 108.

Video content stream generation facility 202 may additionally be configured to generate a 2D video content stream comprising data representative of 2D video content. The 2D video content stream may be generated in accordance with any suitable heuristic, standard, and/or format.

Communication facility 204 may be configured to facilitate communication between provider subsystem 102 and adapter subsystem 104. In particular, communication facility 204 may be configured to transmit and/or receive communication signals, media content instances, metadata and/or any other data to/from adapter subsystem 104. For example, communication facility 204 may transmit (e.g., broadcast, multicast, and/or narrowcast) one or more video content streams (e.g., 3D video content streams and/or 2D video content streams) generated by video content stream generation facility 202 to adapter subsystem 104. Additionally or alternatively, video content streams may be provided to adapter subsystem 104 as one or more data files or in any other suitable manner as may serve a particular implementation. Communication facility 204 may be configured to interface with any suitable communication media, protocols, and formats, including any of those mentioned above.

Storage facility 206 may be configured to maintain 3D video content data 208 representative of 3D video content and 2D video content data 210 representative of 2D video content. Storage facility 206 may maintain additional or alternative data as may serve a particular implementation.

Figure 3:
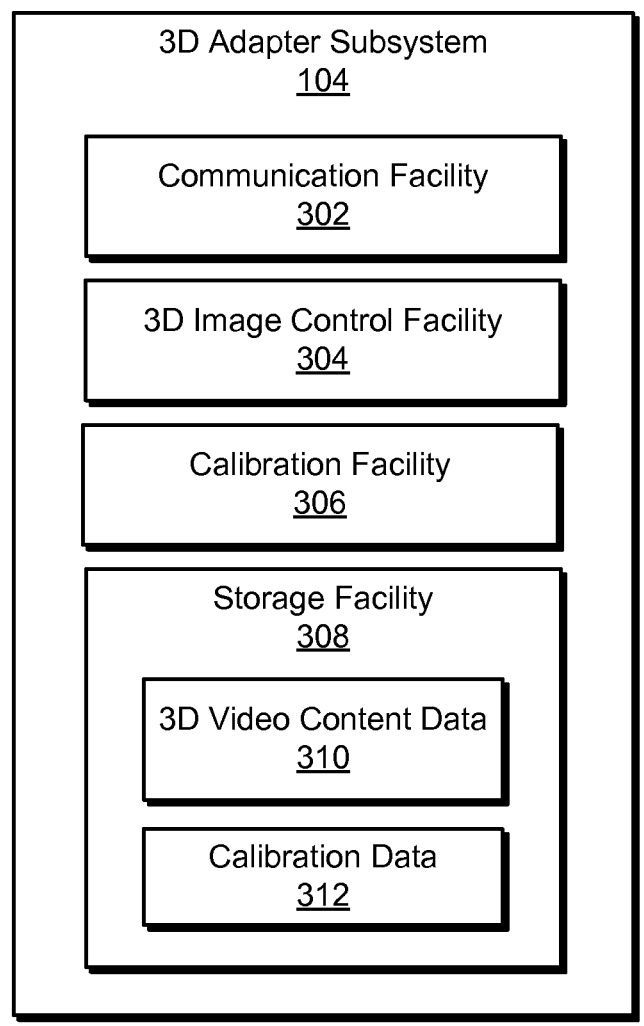
FIG. 3 illustrates exemplary components of a 3D adapter subsystem according to principles described herein.

FIG. 3 illustrates exemplary components of adapter subsystem 104. Adapter subsystem 104, and any components thereof, may be implemented one or more computing devices. For example, adapter subsystem 104 may be implemented by a stand-alone unit, set-top box device, cable box device, personal computer, or the like. Exemplary implementations of adapter subsystem 104 will be described in more detail below.

As shown in FIG. 3, adapter subsystem 104 may include a communication facility 302, a 3D image control facility 304, a calibration facility 306, and a storage facility 308, which may be in communication with one another using any suitable communication technologies. It will be recognized that although facilities 302-308 are shown to be separate facilities in FIG. 3, any of those facilities may be combined into a single facility as may serve a particular application.

Communication facility 302 may be configured to facilitate communication between adapter subsystem 104 and provider subsystem 102. In particular, communication facility 302 may be configured to receive communication signals, media content instances, metadata and/or any other data from provider subsystem 102. For example, communication facility 302 may receive 3D and/or 2D video content in the form of one or more 3D video content streams and/or 2D video content streams from provider subsystem 102. Communication facility 302 may be configured to interface with any suitable communication media, protocols, and formats, including any of those mentioned above.

Image control facility 304 may be configured to process a 3D video content stream received from content provider subsystem 102 and direct display device 108 to display 3D video content in accordance with the 3D video content stream. Image control facility 304 may be configured to process a 3D video content stream in accordance with any suitable 3D content processing heuristic as may serve a particular implementation.

For example, image control facility 304 may be configured operate in accordance with an active shutter processing heuristic. As used herein, an "active shutter processing heuristic" refers to a method of generating and displaying 3D video content wherein images are alternatingly presented to the left and right eyes of a viewer wearing 3D viewing glasses. The 3D viewing glasses, as will be described in more detail below, may be configured to allow only left images to be presented to the left eye and only right images to be presented to the right eye. The images may be presented in rapid enough succession that the viewer does not notice that different images are being presented to both eyes. The net effect is that the left eye only sees the images presented to the left eye and the right eye only sees the images presented to the right eye, thereby creating a perception of 3D in the viewer's brain. An exemplary active shutter processing heuristic will be described in more detail below.

Additionally or alternatively, image control facility 304 may be configured to operate in accordance with a passive polarized processing heuristic. As used herein, a "passive polarized processing heuristic" refers to a method of generating and displaying 3D video content wherein an image intended for the left eye and an image intended for the right eye are concurrently presented to a viewer. The left and right images are polarized in mutually orthogonal directions. The viewer views the image through polarized 3D viewing glasses so that only the left image is presented to the left eye and so that only the right image is presented to the right eye. The viewer's brain combines the two images in to a single 3D image. An exemplary passive polarized processing heuristic will be described in more detail below.

Active shutter and passive polarized processing heuristics are merely illustrative of the many 3D content processing heuristics that may be used in accordance with the systems and methods described herein. It will be recognized that image control facility 304 may be configured to operate in accordance with any other 3D content processing heuristic as may serve a particular implementation.

In some examples, image control facility 304 may be configured to pass a 2D video content stream straight through to display device 108. In this manner, display device 108 may selectively display 3D video content or 2D video content depending on the type of video content stream transmitted to adapter subsystem 104. To this end, image control facility 304 may be configured to determine whether an incoming video content stream is representative of 3D video content or 2D video content. In some examples, provider subsystem 102 may be configured to insert data at the beginning of a video content stream indicating the type of video content represented by the video content stream. Image control facility 304 may be configured to detect the inserted data and process the video content stream accordingly. Image control facility 304 may additionally or alternatively be configured to determine the type of video content represented by an incoming video content stream in any other manner as may serve a particular application.

Image control facility 304 may be additionally be configured to process data representative of graphics (e.g., program guides, closed captioning, text, etc.) to be displayed by display device 108 and configure the data such that the graphics render properly in 3D on display device 108. Any suitable processing heuristic may be applied to such data as may serve a particular application.

Calibration facility 306 may be configured to calibrate a display of the 3D video content in accordance with one or more attributes of display device 108. Calibration may be performed at least because the particular display device 108 in communication with adapter subsystem 104 may vary from situation to situation. To illustrate, in some instances, a 2D television of a particular make and model may be in communication with adapter subsystem 104. In other instances, a different 2D television having a different make and model and/or a computer monitor may be in communication with adapter subsystem 104. Each particular display device 108 may have a distinct set of attributes. Such attributes may include, but are not limited to, display latency (i.e., the time between when display device 108 receives instructions to display a 3D image and when the 3D image is actually displayed by display device 108), size, pixel resolution, refresh rate, make, model, and/or any other attribute associated with display device 108. Exemplary calibration operations that may be performed by calibration facility 306 will be described in more detail below.

Storage facility 308 may be configured to maintain 3D video content data 310 representative of 3D video content and calibration data 312 representative of data generated and/or used by calibration facility 306. Storage facility 308 may maintain additional or alternative data as may serve a particular implementation.

Figure 4:
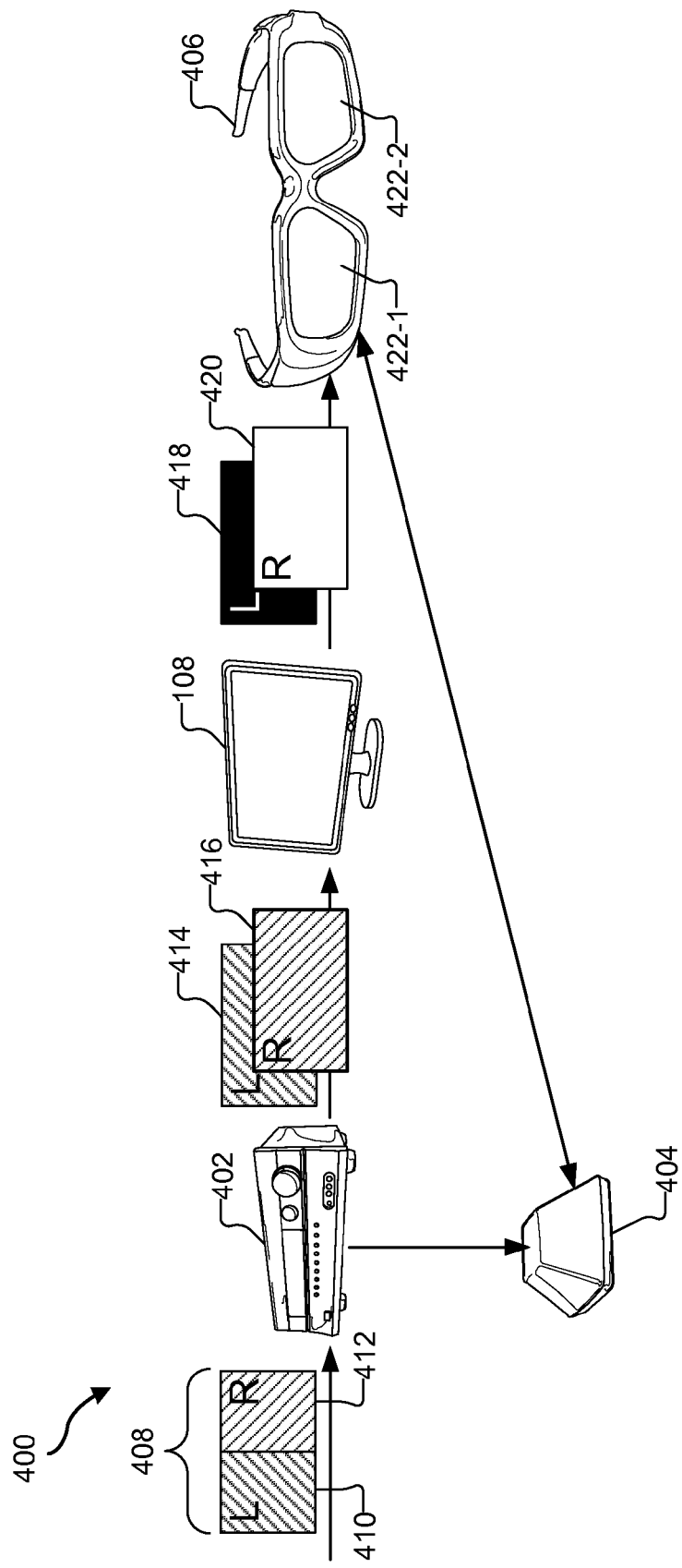
FIG. 4 illustrates an exemplary implementation of the system of FIG. 1 according to principles described herein.

FIG. 4 illustrates an exemplary implementation 400 of system 100 wherein an active shutter processing heuristic is used to present 3D video content to a viewer. As shown in FIG. 4, implementation 400 may include a 3D adapter device 402 (or simply "adapter device 402") in communication with display device 108. Adapter device 402 may be communicatively coupled to an infrared ("IR") sensor 404, which may be configured to control an operation of 3D viewing glasses 406. One or more facilities 302-308 included in adapter subsystem 104 may be implemented by adapter device 402 and IR sensor 404. Each of the components illustrated in FIG. 4 will now be described in more detail.

Adapter device 402 may include a stand-alone unit or may be integrated into another type of device, such as a set-top box device, cable box, or the like. Adapter device 402 may be configured to receive a 3D video content stream, which, as shown in FIG. 4, may include a video frame 408 comprising data 410 representative of a left image intended for a left eye of a viewer and data 412 representative of a right image intended for a right eye of the viewer. Data 410 and 412 may be included and/or arranged in video frame 408 in any suitable manner.

As mentioned, in an active shutter processing heuristic, distinct left and right images are presented to the left and right eyes, respectively, in an alternating manner. To this end, adapter device 402 may be configured to process video frame 408 and generate a left image frame 414 comprising the data representative of the left image and a right image frame 416 comprising the data representative of the right image. Adapter device 402 may then transmit left and right image frames 414 and 416 to display device 108. Display device 108 may use left and right image frames 416 and 418 to generate and sequentially display a left image 418 and a right image 420.

In some examples, left and right image frames 414 and 416 are transmitted to display device 108 by adapter device 402 at a transmission rate at least twice the transmission rate at which video frame 408 is received by adapter device 402. For example, adapter device 402 may receive video frame 408 at a transmission rate of 60 frames/second. In this example, adapter device 402 may transmit left and right image frames 414 and 416 to display device 108 at a transmission rate of at least 120 frames/second. In this manner, the sequential display of left and right images 418 and 420 may go unnoticed to the viewer, thereby resulting in a seamless 3D video content viewing experience for the viewer.

A viewer of left and right images 418 and 420 may wear 3D viewing glasses 406 in order to perceive images 418 and 420 as a single 3D image. 3D viewing glasses 406 may include a right lens 422-1 and a left lens 422-2 (collectively referred to herein as "lenses 422"). Each lens 422 has a shutter (not shown) associated therewith, which is configured to selectively close in order to obscure the view through its respective lens 422. For example, a right shutter associated with right lens 422-1 may be configured to be closed during the display of left image 418 and open during the display of right image 420. Likewise, a left shutter associated with left lens 422-2 may be configured to be closed during the display of right image 420 and open during the display of left image 418. In this manner, only the left image 418 is presented to the left eye and only the right image 420 is presented to the right eye.

IR sensor 404 may be configured to control the opening and closing of the left and right shutters. To this end, IR sensor 404 may receive information from adapter device 402 that indicates when the left and right images 418 and 420 are to be displayed by display device 108 and direct the left and right shutters to open and close accordingly. IR sensor 404 may include any suitable combination of hardware and/or software and may be separate from adapter device 402, as shown in FIG. 4. Alternatively, IR sensor 404 may be integrated into adapter device 402 in any suitable manner. Moreover, it will be recognized that any other type of sensor (e.g., Bluetooth, etc.) may be used in place of IR sensor 404.

As mentioned, display device 108 may have a distinct set of attributes. In an active shutter configuration, for example, display device 108 may have a particular display latency associated therewith. Display latency refers to the time between when display device 108 receives left and right frames 414 and 416 and when left and right images 418 and 420 are actually displayed. Different types of display device 108 may have distinct display latencies associated therewith.

It may be desirable to adjust the timing of the opening and closing of the left and right shutters of 3D viewing glasses 406 to account for the display latency associated with display device 108. To this end, adapter device 402 may be configured to calibrate the display of left and right images 418 and 420 with the display latency associated with display device 108 by synchronizing the display of left and right images 418 and 420 with the opening and closing of the left and right shutters of 3D viewing glasses 406. The synchronization may be performed in response to viewer input and/or automatically.

Figure 5:
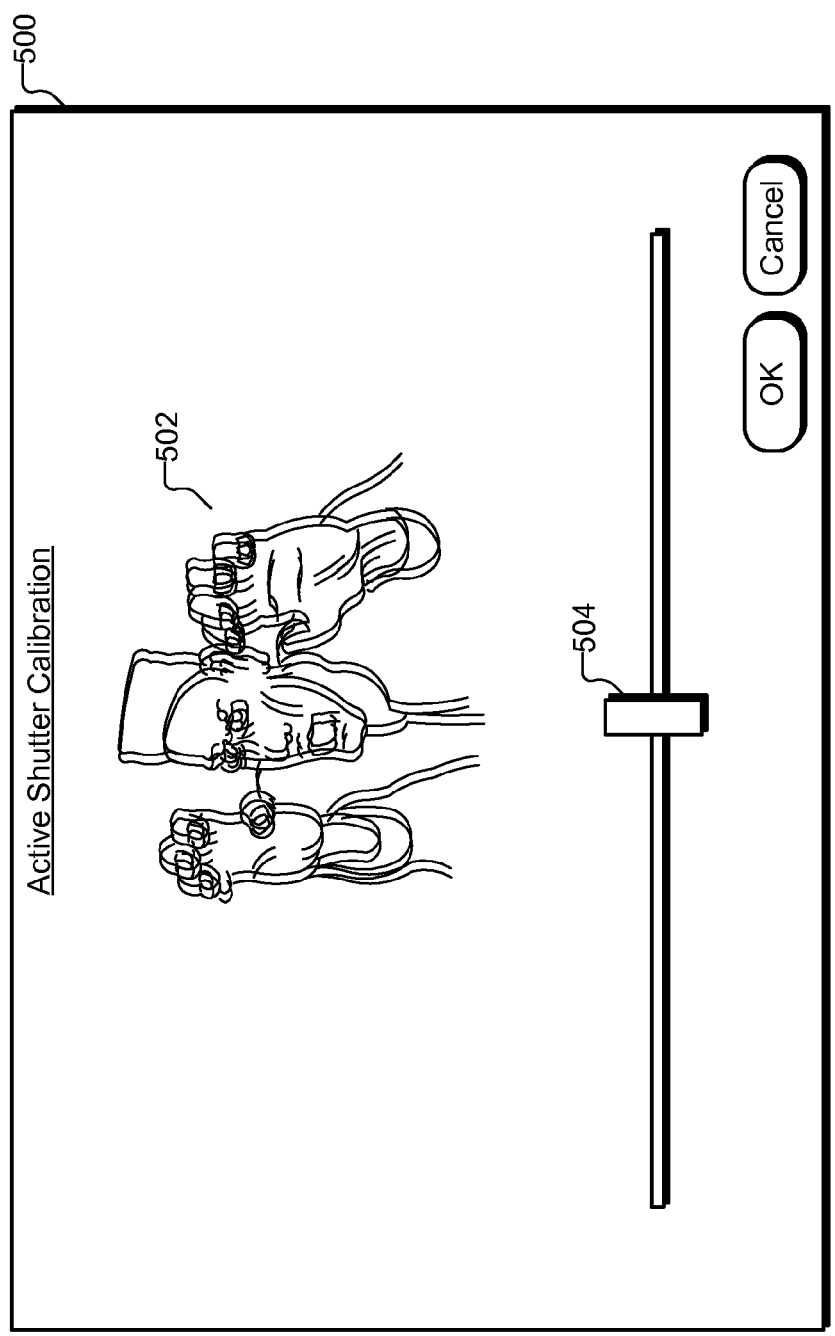
FIG. 5 illustrates an exemplary graphical user interface ("GUI") that may be displayed by display device according to principles described herein.

FIG. 5 illustrates an exemplary graphical user interface ("GUI") 500 that may be displayed by display device 108 in order to facilitate synchronization of the display of left and right images 418 and 420 with the opening and closing of the left and right shutters of 3D viewing glasses 406 in response to viewer input. In some examples, adapter device 402 may direct display device 108 to alternatingly display a plurality of left and right test images. The display of these test images results in the display of a composite 3D test image 502. An adjustment bar 504 or the like may additionally be displayed and used by a viewer to adjust the display of the left and right test images until the composite 3D test image 502 is optimally perceived by the viewer. For example, the viewer may move adjustment bar 504 to the right or left to make composite 3D test image 502 more clear. Adjustment bar 504 may adjust the display of the left and right test images by adjusting a timing of the display of the left and right test images and/or by adjusting a timing of the opening and closing of the left and right shutters of 3D viewing glasses 406.

Adapter device 402 may determine the display latency associated with display device 108 in accordance with the adjustment of the display of left and right images 418 and 420 made by the viewer. Adapter device 402 may then adjust a timing of the opening and closing of the left and right shutters of 3D viewing glasses 406 in accordance with the determined display latency.

Additionally or alternatively, the synchronization of the display of left and right images 418 and 420 with the opening and closing of the left and right shutters of 3D viewing glasses 406 may be performed automatically by adapter device 402. For example, adapter device 402 may be configured to detect a make and model of display device 108 and determine the display latency associated with the display device 108 by accessing a database of makes and models and their associated display latencies. The database may be maintained by adapter device 402, provider subsystem 102, and/or any other computing device as may serve a particular implementation. Once adapter device 402 has determined the display latency associated with the make and model of display device 108, adapter device 402 may adjust a timing of the opening and closing of the left and right shutters of 3D viewing glasses 406 in accordance with the determined display latency. Further adjustment of the timing of the opening and closing of the left and right shutters of 3D viewing glasses 406 may be performed in response to viewer input to account for slight variations in the display latency that may be present depending on the particular display device 108.

It will be recognized that other attributes of display device 108 may be used by adapter device 402 to calibrate the display of left and right images 418 and 420 as may serve a particular implementation. For example, the refresh rate, pixel resolution, size, and/or any other attribute associated with display device 108 may be used by adapter device 402 to calibrate the display of left and right images 418 and 420.

Figure 6:
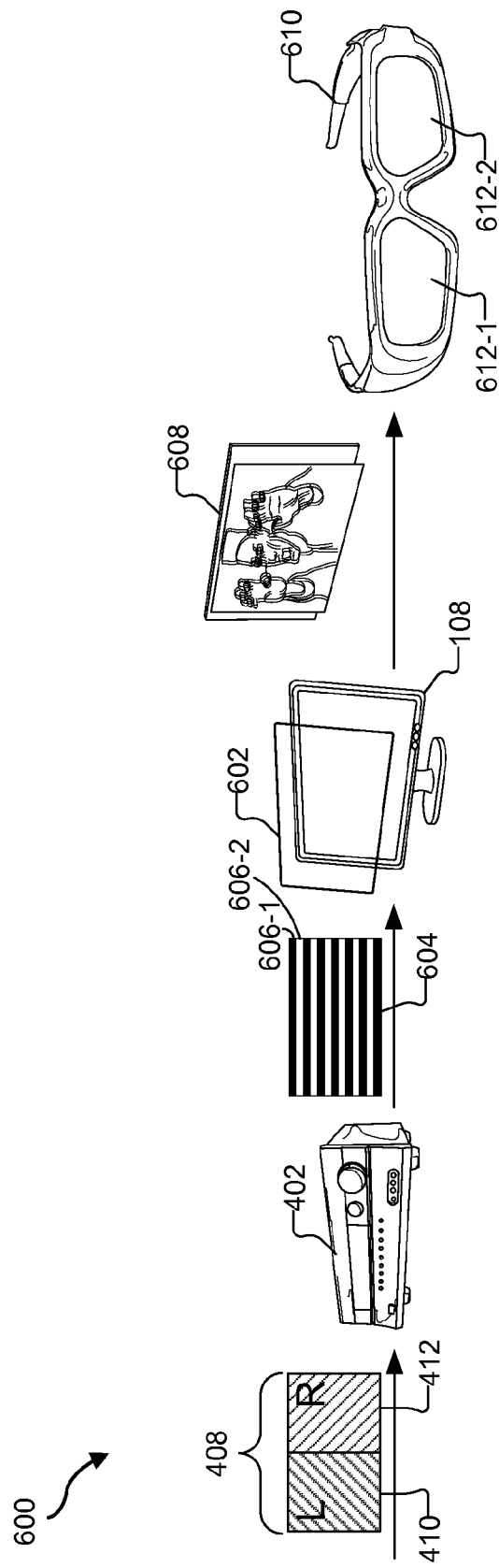
FIG. 6 illustrates another exemplary implementation of the system of FIG. 1 according to principles described herein.

FIG. 6 illustrates an exemplary implementation 600 of system 100 wherein a passive polarized processing heuristic is used to present 3D video content to a viewer. As shown in FIG. 6, implementation 600 may include adapter device 402, display device 108, and a polarizing screen 602 mounted on display device 108. Polarizing screen 602 will be described in more detail below. One or more facilities 302-308 included in adapter subsystem 104 may be implemented by adapter device 402 and polarizing screen 602.

As mentioned, in a passive polarized processing heuristic, left and right images are concurrently presented to the left and right eyes of a viewer. To this end, adapter device 402 may be configured to process video frame 408 and generate another video frame 604 that includes interleaved rows 606 (e.g., rows 606-1 and 606-2) of left image pixels and right image pixels. The left image pixels represent the left image defined by the left image data 410 included in video frame 408 and the right image pixels represent the right image defined by the right image data 412 included in video frame 408. Adapter device 402 may then transmit interleaved video frame 604 to display device 108, which may use interleaved video frame 604 to generate and concurrently display the interleaved rows 606 of left and right image pixels. The displayed left and right pixel rows 606 are represented by composite image 608 in FIG. 6.

Polarizing screen 604 may be configured to polarize the left and right pixel rows 606 in orthogonal directions. In this manner, a viewer wearing 3D viewing glasses 610 with polarized lenses 612-1 and 612-2 may perceive the left and right images represented by the left and right pixel rows 606 as a 3D image.

Figure 7:
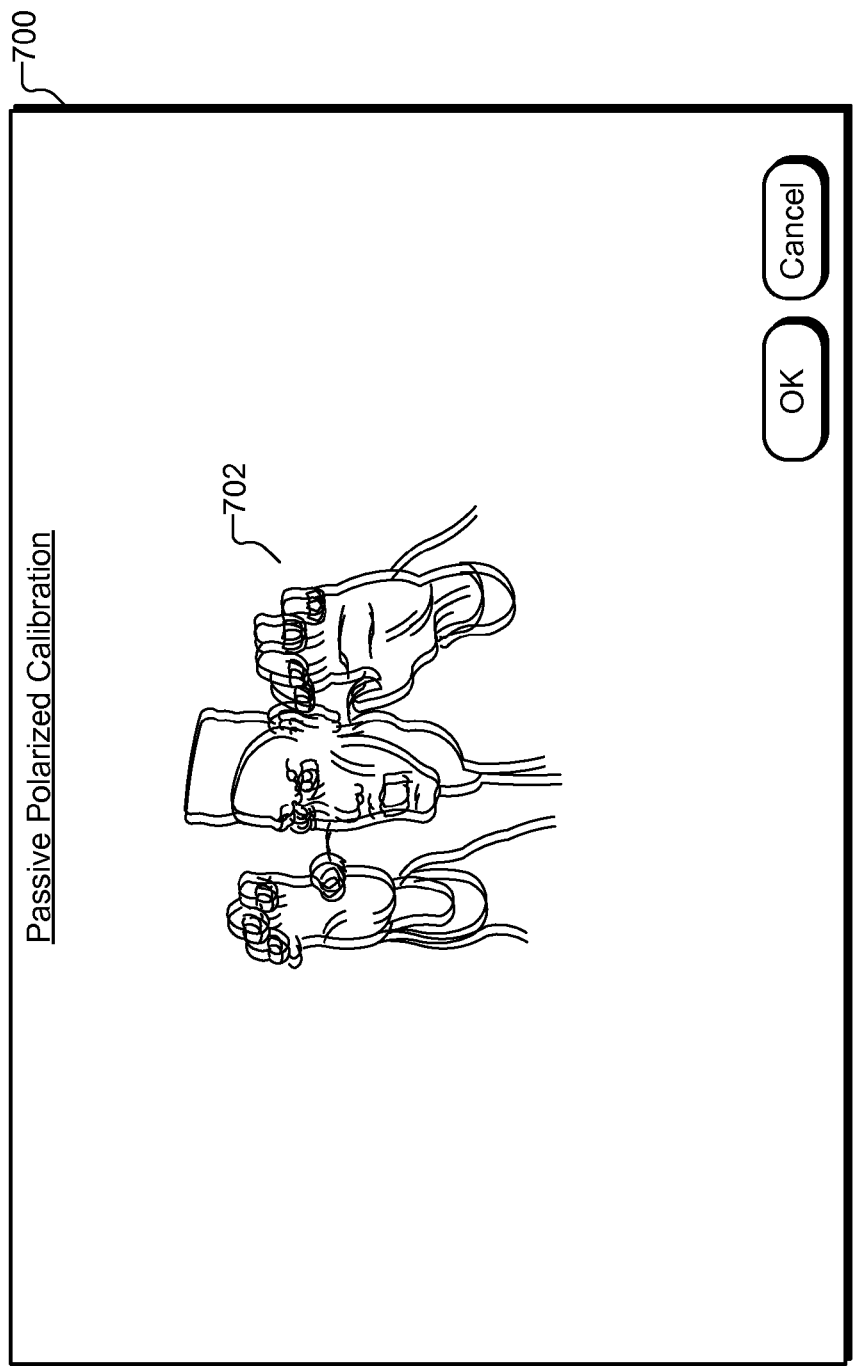
FIG. 7 illustrates another exemplary GUI that may be displayed by display device according to principles described herein.

Adapter device 402 may be configured to calibrate a display of interleaved pixel rows 606 by directing display device 108 to display one or more GUIs configured to facilitate alignment of polarizing screen 602 with the displayed pixel rows 606. For example, FIG. 7 illustrates an exemplary GUI 700 that may be displayed by display device 108 in order to facilitate alignment of polarizing screen 602 with the displayed pixel rows 606. As shown in FIG. 7, adapter device 402 may be configured to direct display device 108 to concurrently display left and right images, thereby resulting in the display of a composite 3D image 702. The viewer may then manually adjust a position of polarizing screen 602 until composite 3D image 702 is optimally perceived by the viewer.

In some examples, adapter subsystem 104 may be configured to selectively process a received video content stream in accordance with either an active shutter processing heuristic or a passive polarized processing heuristic. Hence, the same adapter subsystem 104 may be used in connection with either type of 3D content processing heuristics.

Adapter subsystem 104 may be further configured to process data representative of graphics (e.g., program guides, closed captioning, text, etc.) to be displayed by display device 108 and configure the data such that the graphics render properly in 3D on display device 108. Any suitable processing heuristic may be applied to such data as may serve a particular application.

Figure 8:
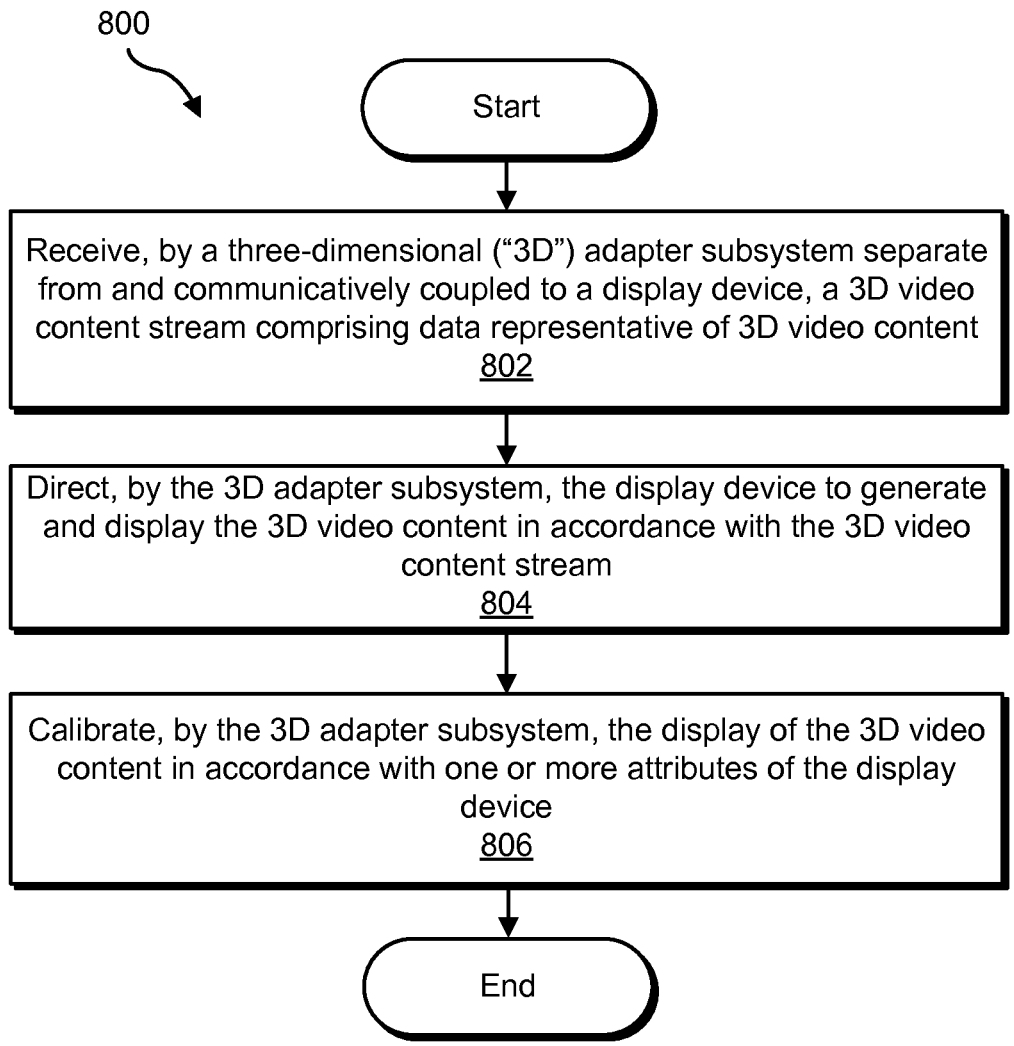
FIG. 8 illustrates an exemplary method of presenting 3D video content on a two-dimensional ("2D") display device according to principles described herein.

FIG. 8 illustrates an exemplary method 800 of presenting 3D video content on a 2D display device. While FIG. 8 illustrates exemplary steps according to one embodiment, other embodiments may omit, add to, reorder, and/or modify any of the steps shown in FIG. 8. The steps shown in FIG. 8 may be performed by any component or combination of components of 3D adapter subsystem 104.

In step 802, a 3D video content stream comprising data representative of 3D video content is received by a 3D adapter subsystem (e.g., 3D adapter subsystem 104) separate from and communicatively coupled to a display device (e.g., display device 108). The 3D video content stream may be received in any of the ways described herein.

In step 804, the 3D adapter subsystem directs the display device to generate and display the 3D video content in accordance with the 3D video content stream. For example, 3D adapter subsystem 104 may direct display device 108 to generate and display the 3D video content by generating left and right image frames and directing display device 108 to generate and sequentially display left and right images represented by the left and right image frames. Additionally or alternatively, 3D adapter subsystem 104 may direct display device 108 to generate and display the 3D video content by generating a video frame having interleaved rows of left image pixels and right image pixels and directing display device 108 to generate and concurrently display the interleaved rows of left and right image pixels.

In step 806, the 3D adapter subsystem calibrates the display of the 3D video content in accordance with one or more attributes of the display device. The calibration may be performed in any of the ways described herein.

Figure 9:
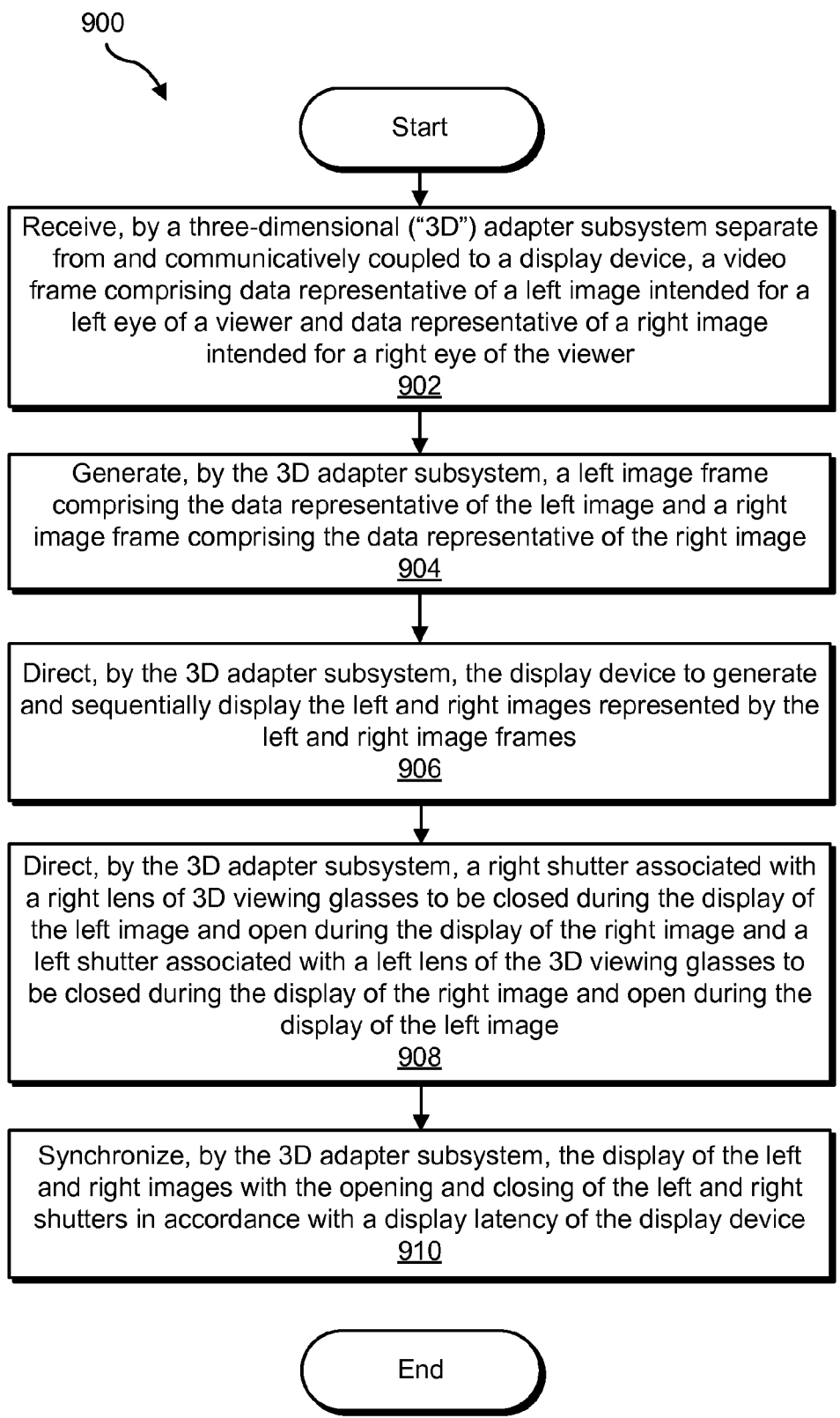
FIG. 9 illustrates an exemplary method of presenting 3D video content on a 2D display device wherein an active shutter processing heuristic is used to present the 3D video content according to principles described herein.

FIG. 9 illustrates an exemplary method 900 of presenting 3D video content on a 2D display device wherein an active shutter processing heuristic is used to present the 3D video content. While FIG. 9 illustrates exemplary steps according to one embodiment, other embodiments may omit, add to, reorder, and/or modify any of the steps shown in FIG. 9. The steps shown in FIG. 9 may be performed by any component or combination of components of 3D adapter subsystem 104.

In step 902, a video frame comprising data representative of a left image intended for a left eye of a viewer and data representative of a right image intended for a right eye of the viewer is received by a 3D adapter subsystem (e.g., 3D adapter subsystem 104) separate from and communicatively coupled to a display device (e.g., display device 108). The video frame may be received in any of the ways described herein.

In step 904, a left image frame comprising the data representative of the left image and a right image frame comprising the data representative of the right image are generated by the 3D adapter subsystem. The left and right image frames may be generated in any of the ways described herein.

In step 906, the display device is directed by the 3D adapter subsystem to generate and sequentially display the left and right images represented by the left and right image frames. Step 906 may be performed in any of the ways described herein.

In step 908, the 3D adapter subsystem directs a right shutter associated with a right lens of 3D viewing glasses to be closed during the display of the left image and open during the display of the right image and a left shutter associated with a left lens of the 3D viewing glasses to be closed during the display of the right image and open during the display of the left image. Step 908 may be performed in any of the ways described herein.

In step 910, the 3D adapter subsystem synchronizes the display of the left and right images with the opening and closing of the left and right shutters in accordance with a display latency of the display device. The display latency may be determined and the synchronization may be performed by the 3D adapter subsystem in any of the ways described herein.

Figure 10:
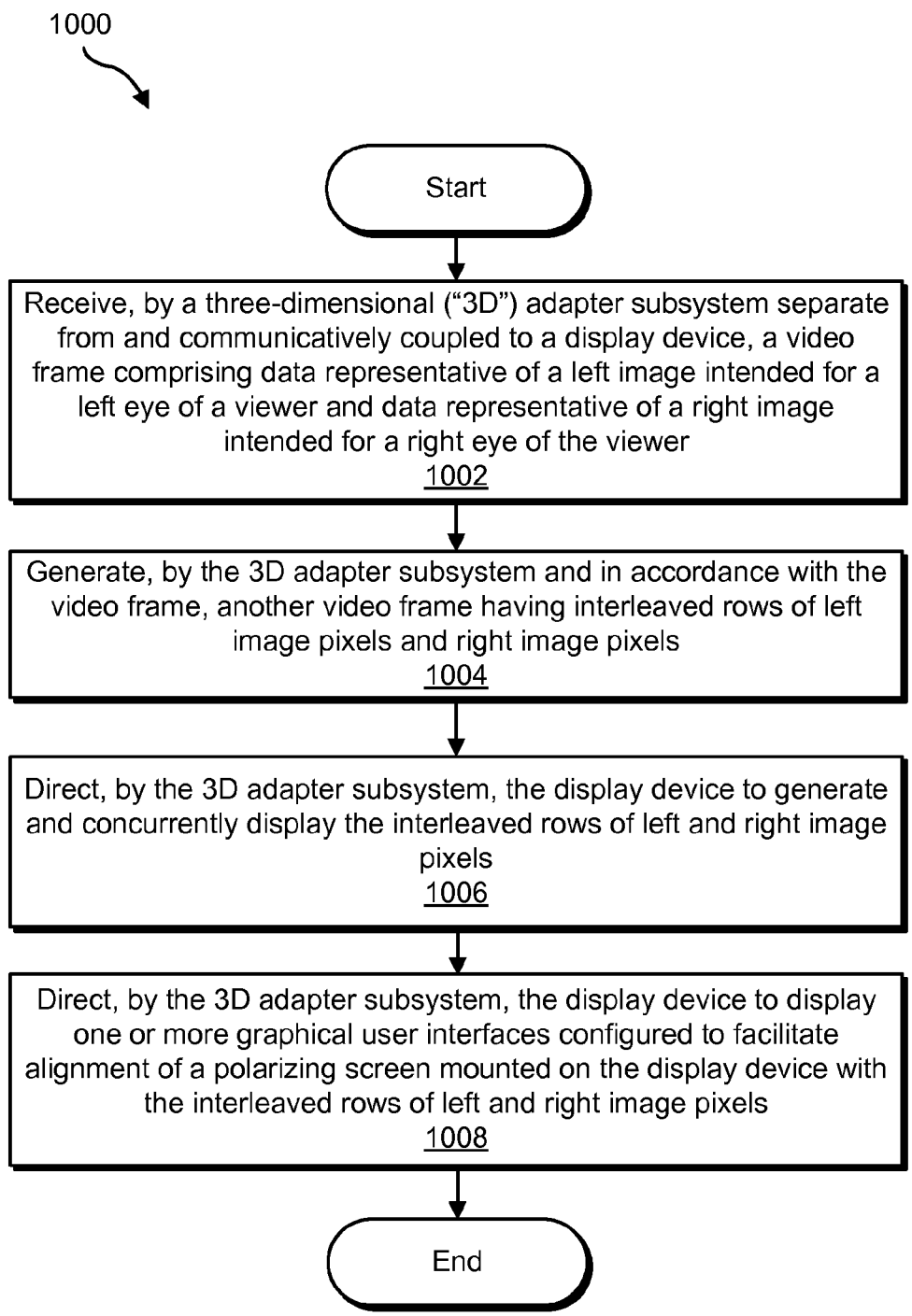
FIG. 10 illustrates an exemplary method of presenting 3D video content on a 2D display device wherein a passive polarization processing heuristic is used to present the 3D video content according to principles described herein.

FIG. 10 illustrates an exemplary method 1000 of presenting 3D video content on a 2D display device wherein a passive polarization processing heuristic is used to present the 3D video content. While FIG. 10 illustrates exemplary steps according to one embodiment, other embodiments may omit, add to, reorder, and/or modify any of the steps shown in FIG. 10. The steps shown in FIG. 10 may be performed by any component or combination of components of 3D adapter subsystem 104.

In step 1002, a video frame comprising data representative of a left image intended for a left eye of a viewer and data representative of a right image intended for a right eye of the viewer is received by a 3D adapter subsystem (e.g., 3D adapter subsystem 104) separate from and communicatively coupled to a display device (e.g., display device 108). The video frame may be received in any of the ways described herein.

In step 1004, another video frame having interleaved rows of left image pixels and right image pixels is generated by the 3D adapter subsystem and in accordance with the video frame. The other video frame may be generated in any of the ways described herein.

In step 1006, the display device is directed by the 3D adapter subsystem to generate and concurrently display the interleaved rows of left and right image pixels. Step 1006 may be performed in any of the ways described herein.

In step 1008, the display device is directed by the 3D adapter device to display one or more graphical user interfaces configured to facilitate alignment of a polarizing screen mounted on the display device with the interleaved rows of left and right image pixels. Step 1008 may be performed in any of the ways described herein.

Figure 11:
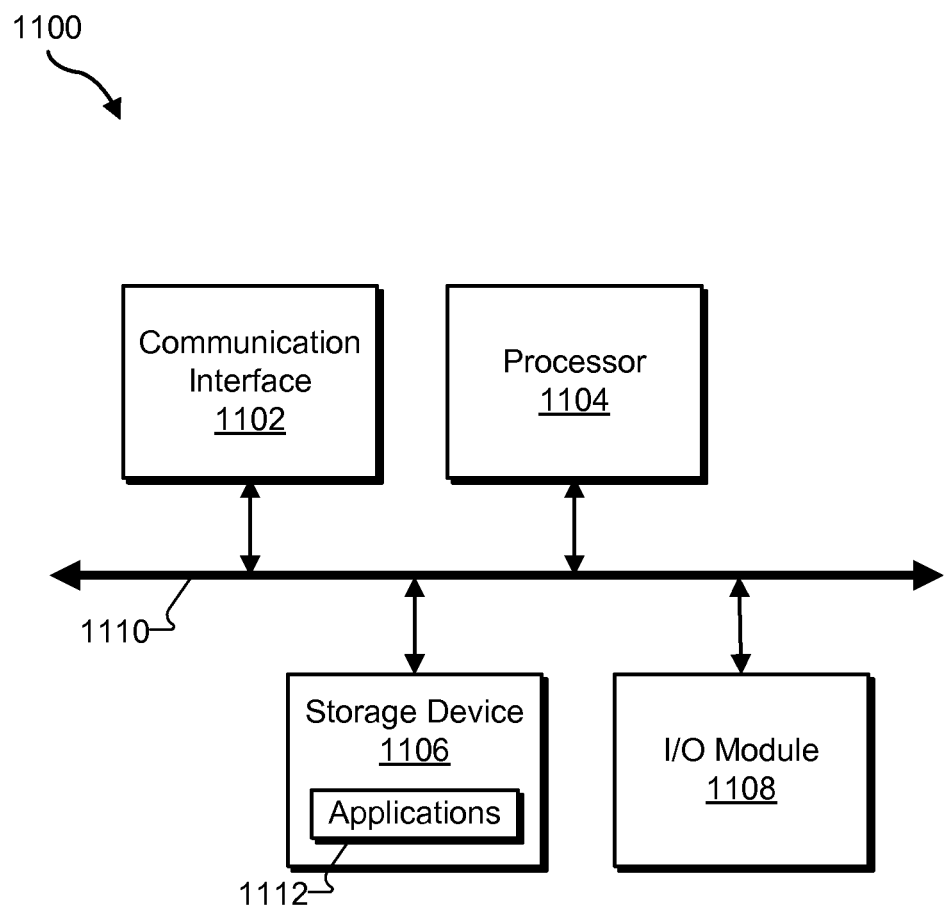
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with video stream generation facility 202, communication facility 204, communication facility 302, 3D image control facility 304, and/or calibration facility 306. Likewise, storage facility 206 and/or storage facility 308 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a three-dimensional ("3D") adapter subsystem separate from and communicatively coupled to a display device, a 3D video content stream comprising data representative of 3D video content;
   determining, by the 3D adapter subsystem, whether the 3D video content stream is configured to be displayed in accordance with an active shutter processing heuristic or in accordance with a passive polarized processing heuristic;
   directing, by the 3D adapter subsystem, the display device to generate and display the 3D video content in accordance with the 3D video content stream;
   selectively calibrating, by the 3D adapter subsystem if the 3D video content stream is determined to be displayed in accordance with the active shutter processing heuristic, the display of the 3D video content in accordance with one or more attributes of the display device and the active shutter processing heuristic; and
   selectively calibrating, by the 3D adapter subsystem if the 3D video content stream is determined to be displayed in accordance with the passive polarized processing heuristic, the display of the 3D video content in accordance with the one or more attributes of the display device and the passive polarized processing heuristic.

2. The method of claim 1, wherein the 3D video content comprises a video frame comprising data representative of a left image intended for a left eye of a viewer and data representative of a right image intended for a right eye of the viewer, and wherein the directing comprises
   generating a left image frame comprising the data representative of the left image and a right image frame comprising the data representative of the right image, and
   directing the display device to generate and sequentially display the left and right images represented by the left and right image frames.

3. The method of claim 2, wherein the method further comprises directing, by the 3D adapter subsystem, a right shutter associated with a right lens of 3D viewing glasses to be closed during the display of the left image and open during the display of the right image and a left shutter associated with a left lens of the 3D viewing glasses to be closed during the display of the right image and open during the display of the left image.

4. The method of claim 3, wherein the calibrating comprises synchronizing the display of the left and right images with the opening and closing of the left and right shutters in accordance with a display latency associated with the display device.

5. The method of claim 2, wherein the directing of the display device to generate and sequentially display the left and right images represented by the left and right image frames comprises transmitting the left and right image frames to the display device at a transmission rate substantially equal to or greater than twice a transmission rate at which the video frame is received by the 3D adapter subsystem.

6. The method of claim 1, wherein the 3D video content comprises a video frame comprising data representative of a left image intended for a left eye of a viewer and data representative of a right image intended for a right eye of the viewer, and wherein the directing comprises
   generating another video frame having interleaved rows of left image pixels and right image pixels, the left image pixels representative of the left image and the right image pixels representative of the right image, and directing the display device to generate and concurrently display the interleaved rows of left and right image pixels.

7. The method of claim 6, wherein the calibrating comprises displaying one or more graphical user interfaces configured to facilitate alignment of a polarizing screen mounted on the display device with the interleaved rows of left and right image pixels.

8. The method of claim 1, embodied as computer-executable instructions on at least one tangible computer-readable medium.

9. A method comprising:
receiving, by a three-dimensional ("3D") adapter subsystem separate from and communicatively coupled to a display device, a video frame comprising data representative of a left image intended for a left eye of a viewer and data representative of a right image intended for a right eye of the viewer;
generating, by the 3D adapter subsystem and in accordance with the video frame, another video frame having interleaved rows of left image pixels and right image pixels, the left image pixels representative of the left image and the right image pixels representative of the right image;
directing, by the 3D adapter subsystem, the display device to generate and concurrently display the interleaved rows of left and right image pixels; and
directing, by the 3D adapter subsystem, the display device to display one or more graphical user interfaces configured to facilitate alignment of a polarizing screen mounted on the display device with the interleaved rows of left and right image pixels.

10. The method of claim 9, embodied as computer-executable instructions on at least one tangible computer-readable medium.

11. A system comprising:
a communication facility configured to receive a three-dimensional ("3D") video content stream comprising data representative of 3D video content;
a 3D image control facility communicatively coupled to the communication facility and configured to
determine whether the 3D video content stream is configured to be displayed in accordance with an active shutter processing heuristic or in accordance with a passive polarized processing heuristic, and
direct a display device to generate and display the 3D video content in accordance with the 3D video content stream; and
a calibration facility communicatively coupled to the 3D image control facility and configured to
selectively calibrate, if the 3D video content stream is determined to be displayed in accordance with the active shutter processing heuristic, the display of the 3D video content in accordance with one or more attributes of the display device and the active shutter processing heuristic, and
selectively calibrate, if the 3D video content stream is determined to be displayed in accordance with the passive polarized processing heuristic, the display of the 3D video content in accordance with the one or more attributes of the display device and the passive polarized processing heuristic;
wherein the communication facility, the 3D image control facility, and the calibration facility are separate from the display device.

12. The system of claim 11, wherein the 3D video content comprises a video frame comprising data representative of a left image intended for a left eye of a viewer and data representative of a right image intended for a right eye of the viewer, and wherein the 3D image control facility is configured to direct the display device to generate and display the 3D video content by:
generating a left image frame comprising the data representative of the left image and a right image frame comprising the data representative of the right image, and
directing the display device to generate and sequentially display the left and right images represented by the left and right image frames.

13. The system of claim 12, wherein:
the 3D image control facility is further configured to direct a right shutter associated with a right lens of 3D viewing glasses to be closed during the display of the left image and open during the display of the right image and a left shutter associated with a left lens of the 3D viewing glasses to be closed during the display of the right image and open during the display of the left image; and
the calibration facility is configured to calibrate the display of the 3D video content by synchronizing the display of the left and right images with the opening and closing of the left and right shutters in accordance with a display latency associated with the display device.

14. The system of claim 11, wherein the 3D video content comprises a video frame comprising data representative of a left image intended for a left eye of a viewer and data representative of a right image intended for a right eye of the viewer, and wherein the 3D image control facility is configured to direct the display device to generate and display the 3D video content by:
generating another video frame having interleaved rows of left image pixels and right image pixels, the left image pixels representative of the left image and the right image pixels representative of the right image, and
directing the display device to generate and concurrently display the interleaved rows of left and right image pixels.

15. The system of claim 14, wherein the calibration facility is configured to calibrate the display of the 3D video content by displaying one or more graphical user interfaces configured to facilitate alignment of a polarizing screen mounted on the display device with the interleaved rows of left and right image pixels.

16. A system comprising:
a two-dimensional ("2D") display device; and
a three-dimensional ("3D") adapter device separate from and communicatively coupled to the 2D display device, the 3D adapter device configured to
receive a 3D video content stream comprising data representative of 3D video content,
determine whether the 3D video content stream is configured to be displayed in accordance with an active shutter processing heuristic or in accordance with a passive polarized processing heuristic,
direct the 2D display device to generate and display the 3D video content in accordance with the 3D video content stream,
selectively calibrate, if the 3D video content stream is determined to be displayed in accordance with the active shutter processing heuristic, the display of the 3D video content in accordance with one or more attributes of the 2D display device and the active shutter processing heuristic, and selectively calibrate, if the 3D video content stream is determined to be displayed in accordance with the passive polarized processing heuristic, the display of the 3D video content in accordance with the one or more attributes of the 2D display device and the passive polarized processing heuristic.

* * * * *